(12) United States Patent
Wehbe et al.

(10) Patent No.: US 12,001,557 B2
(45) Date of Patent: Jun. 4, 2024

(54) METHOD AND SYSTEM FOR CONTINUOUSLY VERIFYING INTEGRITY OF SECURE INSTRUCTIONS DURING RUNTIME

(71) Applicant: RENESAS ELECTRONICS AMERICA INC., Milpitas, CA (US)

(72) Inventors: Taimour Wehbe, Milpitas, CA (US); Marc Adas, Milpitas, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 54 days.

(21) Appl. No.: 17/125,208

(22) Filed: Dec. 17, 2020

(65) Prior Publication Data

US 2021/0200873 A1  Jul. 1, 2021

Related U.S. Application Data

(60) Provisional application No. 62/955,949, filed on Dec. 31, 2019.

(51) Int. Cl.
*G06F 21/57* (2013.01)
*H04L 9/32* (2006.01)

(52) U.S. Cl.
CPC ........ *G06F 21/57* (2013.01); *G06F 2221/034* (2013.01); *H04L 9/3236* (2013.01)

(58) Field of Classification Search
CPC ... G06F 21/57; G06F 2221/034; H04L 9/3236
See application file for complete search history.

(56) References Cited

U.S. PATENT DOCUMENTS

| | | | | |
|---|---|---|---|---|
| 10,089,498 | B2 * | 10/2018 | Edwards | G06F 21/52 |
| 11,138,315 | B2 * | 10/2021 | Ndu | G06F 21/568 |
| 2006/0015748 | A1 * | 1/2006 | Goto | G06F 21/71 |
| | | | | 713/190 |
| 2006/0112420 | A1 * | 5/2006 | Challener | G06F 21/41 |
| | | | | 726/5 |
| 2008/0244746 | A1 * | 10/2008 | Rozas | G06F 21/57 |
| | | | | 726/25 |

(Continued)

*Primary Examiner* — Wasika Nipa
*Assistant Examiner* — Zhe Liu
(74) *Attorney, Agent, or Firm* — Foley & Lardner LLP

(57) ABSTRACT

Example implementations include a method of requesting an instruction block associated with one or more instructions and located at one or more addresses of a system memory, obtaining the instruction block from the system memory, generating a hash of the instruction block, obtaining an expected hash associated with the instruction block, comparing the expected hash with the generated hash, in accordance with a determination that the expected hash matches the generated hash, generating a first validation response associated with the instruction block. Example implementations also include a method of obtaining a secure instruction image including an expected hash associated with an instruction block, the instruction block associated with one or more instructions and located at one or more addresses of a system memory, storing the secure instruction image at a configuration register, and enabling the hardware controller to perform one or more hashing operations associated with the instruction block during runtime of a system processor.

18 Claims, 6 Drawing Sheets

(56) References Cited

U.S. PATENT DOCUMENTS

| | | | |
|---|---|---|---|
| 2010/0293614 A1* | 11/2010 | Vilppola | G06F 21/52 |
| | | | 726/22 |
| 2011/0307961 A1* | 12/2011 | de Perthuis | H04L 63/123 |
| | | | 726/26 |
| 2014/0281354 A1* | 9/2014 | Tkacik | G06F 12/1009 |
| | | | 711/206 |
| 2015/0052616 A1* | 2/2015 | Hutchison | G06F 3/0632 |
| | | | 726/27 |
| 2015/0150127 A1* | 5/2015 | Ning | G06F 21/57 |
| | | | 726/22 |
| 2015/0220736 A1* | 8/2015 | Martinez | G06F 13/24 |
| | | | 711/163 |
| 2016/0092377 A1* | 3/2016 | Sauer | G06F 1/3225 |
| | | | 711/163 |
| 2019/0042765 A1* | 2/2019 | Chung | G06F 21/602 |
| 2019/0087185 A1* | 3/2019 | Kim | G06F 21/572 |
| 2019/0095351 A1* | 3/2019 | Chhabra | H04L 9/3242 |
| 2020/0311314 A1* | 10/2020 | Troia | H04L 9/3247 |
| 2020/0313861 A1* | 10/2020 | Troia | G06F 3/0673 |
| 2021/0011632 A1* | 1/2021 | Stöttinger | G06F 16/9014 |

* cited by examiner

METHOD AND SYSTEM FOR CONTINUOUSLY VERIFYING INTEGRITY OF SECURE INSTRUCTIONS DURING RUNTIME

CROSS-REFERENCE TO RELATED PATENT APPLICATIONS

This application claims priority to U.S. Provisional Patent Application Ser. No. 62/955,949, entitled "HARDWARE-BASED CONTINUOUS RUNTIME INTEGRITY CHECKS OF SECURE BOOT CODE IN IOT DEVICES" filed Dec. 31, 2019, the contents of such application being hereby incorporated by reference in its entirety and for all purposes as if completely and fully set forth herein.

TECHNICAL FIELD

The present implementations relate generally to encryption systems, and more particularly to continuously verifying integrity of secure instructions during runtime.

BACKGROUND

Embedded computing processors and systems are increasingly subject to broader application scenarios involving greater risk of unauthorized modification. As one example, embedded systems deployed in devices and systems under customer or third party control are exposed to more points of attack and thus additional security vulnerabilities. Secure code, instructions, data, or the like stored on such systems is more open to compromise, modification, and altered operation, and must be continually verified to ensure integrity thereof. However, conventional systems may not effectively verify integrity of secure code, instructions, data, or the like with sufficient frequency to detect unauthorized modification after deployment in high-risk or insecure operating environments. Thus, a technological solution for continuously verifying integrity of secure instructions during runtime is desired.

SUMMARY

Example implementations include a method including requesting an instruction block associated with one or more instructions and located at one or more addresses of a system memory, obtaining the instruction block from the system memory, generating a hash of the instruction block, obtaining an expected hash associated with the instruction block, comparing the expected hash with the generated hash, in accordance with a determination that the expected hash matches the generated hash, generating a first validation response associated with the instruction block.

Example implementations also include a method including obtaining a secure instruction image including an expected hash associated with an instruction block, the instruction block associated with one or more instructions and located at one or more addresses of a system memory, storing the secure instruction image at a configuration register, and enabling the hardware controller to perform one or more hashing operations associated with the instruction block during runtime of a system processor.

Example implementations also include a system with a hardware controller including an enable input node and an interrupt input node, and configured to request an instruction block associated with one or more instructions and located at one or more addresses of a system memory, obtain an expected hash associated with the instruction block, and, in accordance with a determination that the expected hash matches a generated hash, generating a first validation response associated with the instruction block, a bus master engine operatively coupled to the hardware controller, and configured to obtain the instruction block from the system memory, and buffer the obtained instruction block to a buffer memory, a hash engine operatively coupled to the buffer memory, and configured to generate the generated hash of the instruction block, and a comparator operatively coupled to the hardware controller and the hash engine, and configured to compare the expected hash with the generated hash.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Present implementations include example devices and systems to continuously, constantly, repeatedly, or similarly monitor secure code, instructions, data, and the like stored on embedded systems for modification, and to alert the system upon detection of modification. Thus, in some implementations, the present implementations are operable to modify, halt, block, or the like, operation of the example system in response to a modification of secure portions of a system memory. It is to be understood that present implementations are not limited to embedded systems.

Figure 1:
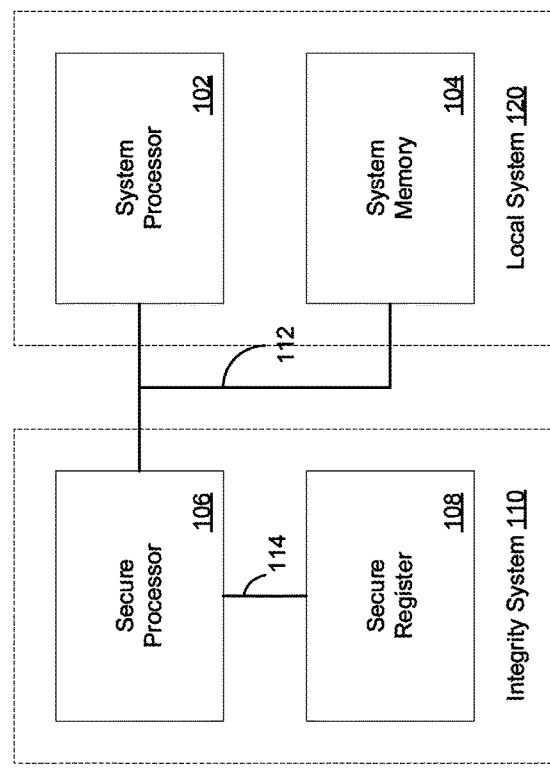
FIG. 1 illustrates an example system, in accordance with present implementations.

FIG. 1 illustrates an example system, in accordance with present implementations. As illustrated by way of example in FIG. 1, an exemplary system 100 includes at least one of an integrity system 110 and a local system 120 operatively coupled by a system bus 112. In some implementations, the integrity system 110 includes a secure processor 106 and a secure register 108 operatively coupled by a secure communication bus 114. In some implementations, the local system 120 includes a system processor 102 and a system memory 104. In some implementations, the integrity system 110 and the local system 120 each respectively include an electronic circuit board, printed circuit board, conductive substrate, or the like. In some implementations, the integrity system 110 and the local system 120 are disposed, formed located, assembled, fabricated, bonded, or the like, to a common device, substrate, component, or the like.

The system processor 102 is operable to execute one or more instructions associated with the local system 120. In some implementations, the system processor 102 is an electronic processor, an integrated circuit, or the like including one or more of digital logic, analog logic, digital sensors, analog sensors, communication buses, volatile memory, nonvolatile memory, and the like. In some implementations, the system processor 102 includes but is not limited to, at least one microcontroller unit (MCU), microprocessor unit (MPU), central processing unit (CPU), graphics processing unit (GPU), physics processing unit (PPU), embedded controller (EC), or the like. In some implementations, the system processor 102 includes a memory operable to store or storing one or more instructions for operating components of the system processor 102 and operating components operably coupled to the system processor 102. In some implementations, the one or more instructions include at least one of firmware, software, hardware, operating systems, embedded operating systems, and the like. It is to be understood that at least one of the system processor 102 and the local system 120 generally can include at least one communication bus controller to effect communication between the system processor 102 and other elements of the local system 120.

The system memory 104 is operable to store data associated with the local system 120. In some implementations, the system memory 104 includes ones or more hardware memory devices for storing binary data, digital data, or the like. In some implementations, the system memory 104 includes one or more electrical components, electronic components, programmable electronic components, reprogrammable electronic components, integrated circuits, semiconductor devices, flip flops, arithmetic units, or the like. In some implementations, the system memory 104 includes at least one of a non-volatile memory device, a solid-state memory device, a flash memory device, and a NAND memory device. In some implementations, the system memory 104 includes one or more addressable memory regions disposed on one or more physical memory arrays. In some implementations, a physical memory array includes a NAND gate array disposed on a particular semiconductor device, integrated circuit device, printed circuit board device, and the like.

The secure processor 106 is operable to execute one or more instructions associated with the integrity system 110. In some implementations, the secure processor 106 validates content, configuration, security, or the like, of at least a portion of the system memory 104 of the local system 120. In some implementations, the secure processor 106 validates content, configuration, security, or the like, of at least a portion of a contiguous physical or logical address block of the system memory 104 of the local system 120. In some implementations, the secure processor 106 is operable to perform one or more processing operations associated with restricting or preventing modification to the system memory 104. In some implementations, the secure processor 106 is operatively coupled to the system bus 112. In some implementations, the secure processor 106 includes one or more devices in accordance with the system processor 102.

The secure register 108 is operable to store data associated with the integrity system 110. In some implementations, the integrity system 110 limits or prevents access to at least a portion of the secure register 108 from the local system 110. In some implementations, the secure register 108 includes ones or more hardware memory devices for storing binary data, digital data, or the like. In some implementations, the secure register 108 includes one or more electrical components, electronic components, programmable electronic components, reprogrammable electronic components, integrated circuits, semiconductor devices, flip flops, arithmetic units, or the like. In some implementations, the secure register 108 includes at least one of a non-volatile memory device, a solid-state memory device, a flash memory device, and a NAND memory device. In some implementations, the secure register 108 includes one or more addressable memory regions disposed on one or more physical memory arrays. In some implementations, a physical memory array includes a NAND gate array disposed on a particular semiconductor device, integrated circuit device, printed circuit board device, and the like.

The system bus 112 is operable to communicate one or more instructions, signals, conditions, states, or the like between one or more of the system processor 102, the system processor 102, the system memory 104, and the integrity system 110. In some implementations, the system bus 112 includes one or more digital, analog, or like communication channels, lines, traces, or the like. The secure communication bus 114 is operable to communicate one or more instructions, signals, conditions, states, or the like between one or more of the secure processor 106, the secure register 108, and the local system 120. In some implementations, the system bus 114 includes one or more digital, analog, or like communication channels, lines, traces, or the like.

Figure 2:
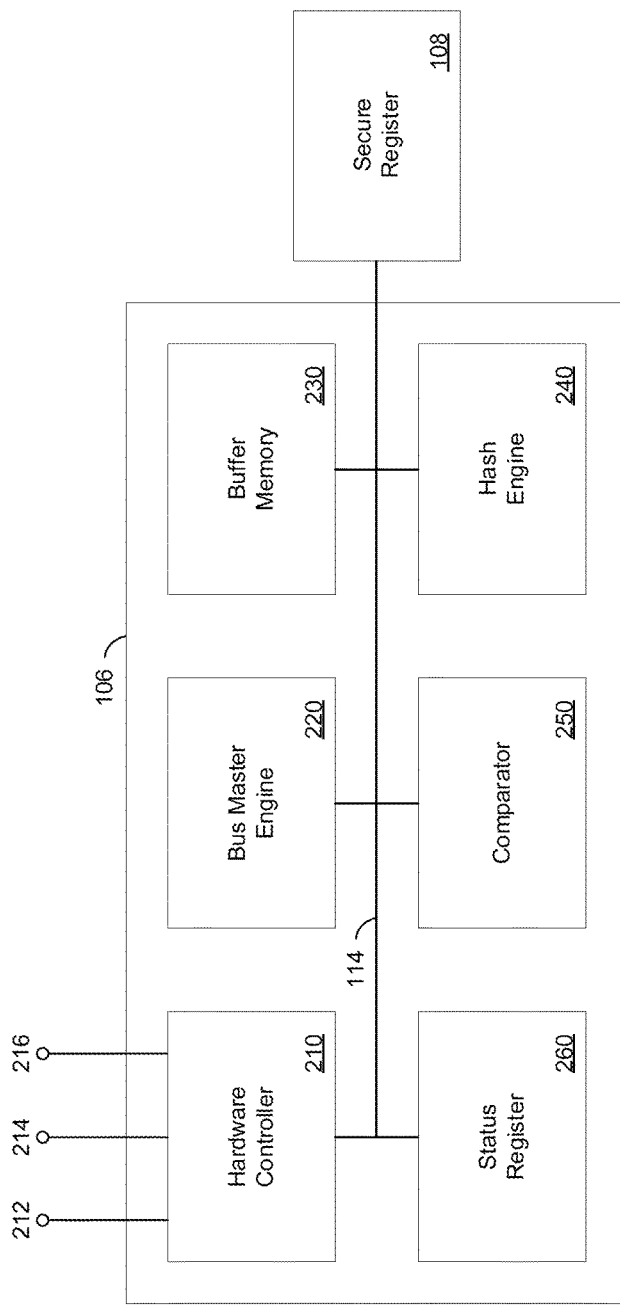
FIG. 2 illustrates an example secure processor further to the example system of FIG. 1.

FIG. 2 illustrates an example secure processor further to the example system of FIG. 1, in accordance with present implementations. As illustrated by way of example in FIG. 2, an example secure processor 200 includes a hardware controller 210, a bus master engine 220, a buffer memory 230, a hash engine 240, a comparator 250, and a status register 260. In some implementations, the example secure processor 200 corresponds to the secure processor 106.

The hardware controller 210 is operable to control one or more operations to validate integrity of the system memory 104. In some implementations, the hardware controller 210 is operable to repeatedly initiate, control, manage, or the like, a validation operation associated with the system memory 104. In some implementations, the hardware controller 210 is operable to continuously repeat one or more validation operations continuously during operation of at least one of the system processor 102, the system memory 104, the secure processor 106, and the secure register 108. In some implementations, the hardware controller 210 is operable concurrently with, simultaneously with, in parallel with, independently of, or the like, at least one of the system processor 102 and the system memory 104. In some implementations, the hardware controller operates in response to or under control of a system clock associated with, integrated with or the like, the system processor 102. In some implementations, the hardware controller operates in response to or under control of a secure clock independent of, disconnected from, or the like, the system processor 102 or any clock associated therewith. In some implementations, the hardware controller 210 includes one or more logical or electronic devices including but not limited to integrated circuits, logic gates, flip flops, gate arrays, programmable gate arrays, and the like. It is to be understood that any electrical, electronic, or like devices, or components associated with the hardware controller 210 can also be associated with, integrated with, integrable with, replaced by, supplemented by, complemented by, or the like, the secure processor 106 or any component thereof. In some implementations, the hardware controller includes system bus node 212, enable input node 214, and interrupt output node 216.

The system bus node 212 is operable to communicate one or more instructions, commands, and the like to and from at least one of the system processor 102 and the system memory 104 by the system bus 112. In some implementations, the system bus node 212 operatively couples the example secure processor 200 to the system bus 112. The enable input node 214 is operable to receive an enable input signal and to switch the hardware controller 210 between a checking mode and a configuration mode. In some implementations, the checking mode causes the hardware controller 210 to operate in a state, configuration, or the like, to validate, repeatedly validate, or the like, one or more portions of the system memory 104. In some implementations, the configuration mode is or includes one or more actions or the like in accordance with FIG. 4. In some implementations, the checking mode is or includes one or more actions or the like in accordance with FIGS. 5 and 6.

The interrupt output node 216 is operable to transmit an interrupt signal from the hardware controller 210. In some implementations, the interrupt output node 216 I operatively coupled to the system processor 102. In some implementations, the system processor 102 performs one or more operations associated with a safe mode or the like in response to receiving an interrupt signal from the interrupt output node 216. As one example, the safe mode can cause the system processor 102 to halt operation. As another example, the safe mode can cause the system processor 102 to operate with a subset of available functions. As another example, the safe mode can cause the system processor 102 to operatively disconnect from the system memory or block one or more addresses thereof. In this example, the interrupt output node 216 can cause the system processor 102 to operate assume that the system memory 104 contains corrupted, unvalidated, compromised, or like instructions, and block use of at least a portion of the system memory 104 in response.

The bus master engine 220 is operable to retrieve, generate, or the like, one or more memory addresses from the system memory 104. In some implementations, the bus master engine 220 is operable to retrieve one or more memory blocks based on a starting address and an address range, size, or the like. In some implementations, the bus master engine 220 contains one or more registers, accumulators, flip-flops, multiplexers, or the like to receive one or more bits, address lines, or the like from the system memory. In some implementations, the bus master engine 220 can retrieve instructions stored at an address at a bus transfer rate faster than operation of at least one of the hash engine 240 and the comparator 250. In some implementations, the bus master engine 220 includes one or more logical or electronic devices including but not limited to integrated circuits, logic gates, flip flops, gate arrays, programmable gate arrays, and the like. It is to be understood that any electrical, electronic, or like devices, or components associated with the bus master engine 220 can also be associated with, integrated with, integrable with, replaced by, supplemented by, complemented by, or the like, the secure processor 106 or any component thereof.

The buffer memory 230 is operable to store one or more instructions received from the bus master engine 220 and to transmit one or more instructions to the hash engine 240. In some implementations, the buffer memory 230 is or includes one or more first-in, first-out ("FIFO") queues including one or more inputs operably coupled to the bus master engine 220 and one or more outputs operably coupled to the hash engine 240. Alternatively, in some implementations, the buffer memory 230 is or includes one or more parallel registers, memory arrays, or the like, including one or more inputs operably coupled to the bus master engine 220 and one or more outputs operably coupled to the hash engine 240. In some implementations, the buffer memory 230 is operable to receive input from the bus master engine 230 at the bus transfer rate. In some implementations, the buffer memory 230 is operable to generate output to the hash engine 240 at a hash transfer rate lower than the bus transfer rate. It is to be understood that the buffer memory 230 can be optionally included in the example secure processor 200 where the bus transfer rate and the hash transfer rate satisfy a transfer criterion. In some implementations, the transfer criterion includes a state in which the bus transfer rate is higher than the hash transfer rate. In some implementations, the buffer memory 230 includes one or more logical or electronic devices including but not limited to integrated circuits, logic gates, flip flops, gate arrays, programmable gate arrays, and the like. It is to be understood that any electrical, electronic, or like devices, or components associated with the buffer memory 230 can also be associated with, integrated with, integrable with, replaced by, supplemented by, complemented by, or the like, the secure processor 106 or any component thereof.

The hash engine 240 is operable of generate at least one hash based on at least one instruction, record, or the like. In some implementations, the hash engine 240 receives one or more instructions from one or more of the bus master engine 220 and the buffer memory 230. In some implementations, the hash engine is or includes 240 at least one cryptographic, mathematical, arithmetic, or like processor, logical device, or the like, to generate a unique hash value derived from received instructions. In some implementations, the hash engine 240 is operable to generate the unique hash based on a plurality of instructions associated with a particular address range, address block, address size, or the like. Thus, in some implementations, the hash engine 240 can generate a hash based on an entire block of instructions received from the bus master engine 220 or the buffer memory 230. In some implementations, the hash engine 240 includes a cryptographic hash function immutably embedded therein. In some implementations, the cryptographic hash function is individualized to at least one of the hardware controller 210, the secure processor 106, the secure register 108, the system processor 102, and the system memory 104. In some implementations, the hash engine 240 includes one or more logical or electronic devices including but not limited to integrated circuits, logic gates, flip flops, gate arrays, programmable gate arrays, and the like. It is to be understood that any electrical, electronic, or like devices, or components associated with the hash engine 240 can also be associated with, integrated with, integrable with, replaced by, supplemented by, complemented by, or the like, the secure processor 106 or any component thereof.

The comparator 250 is operable to compare a hash generated by the hash engine 240 with a hash obtained from the secure register. In some implementations, the comparator 250 includes one or more logic gates receiving one or more corresponding bits from the hash generated by the hash engine 240 with the hash obtained from the secure register. In some implementations, the comparator 250 is directly operatively coupled to the secure register 108 by the secure communication bus 114 to retrieve a hash from the secure register 108 in response to an instruction, command, or the like, from the hardware controller 210. Alternatively, in some implementations, the comparator 250 is operatively coupled to the secure register 108 by the secure communication bus 114 to retrieve a hash from the hardware controller 210 in response to an instruction, command, or the like, from the hardware controller 210 to the secure register 108. In some implementations, the comparator 250 is operable to output a first binary response in response to receiving identical, matching, corresponding, equal, equivalent, or the like hashes, and to output a second binary response otherwise. As one example, the first binary response can be a "1" or "TRUE" response corresponding to a high voltage level, and a second binary response can be a "0" or "FALSE" response corresponding to a low voltage level. In some implementations, the comparator 250 includes one or more logical or electronic devices including but not limited to integrated circuits, logic gates, flip flops, gate arrays, programmable gate arrays, and the like. It is to be understood that any electrical, electronic, or like devices, or components associated with the comparator 250 can also be associated with, integrated with, integrable with, replaced by, supplemented by, complemented by, or the like, the secure processor 106 or any component thereof.

The status register 260 is operable to store a result associated with an output of the comparator 250. In some implementations, the status register 260 is or includes an accumulator, a register, a gate array, a flip-flop, or the like having a bit length equal to or greater than a word length capacity of at least one of the hash engine 240 and the comparator 250. As one example, the status register may have a bit length of 32 bits, and the hash engine 240 and the comparator 250 may each have a word length capacity of 16 bits. In some implementations, the status register 260 includes one or more logical or electronic devices including but not limited to integrated circuits, logic gates, flip flops, gate arrays, programmable gate arrays, and the like. It is to be understood that any electrical, electronic, or like devices, or components associated with the status register 260 can also be associated with, integrated with, integrable with, replaced by, supplemented by, complemented by, or the like, the secure processor 106 or any component thereof.

Figure 3:
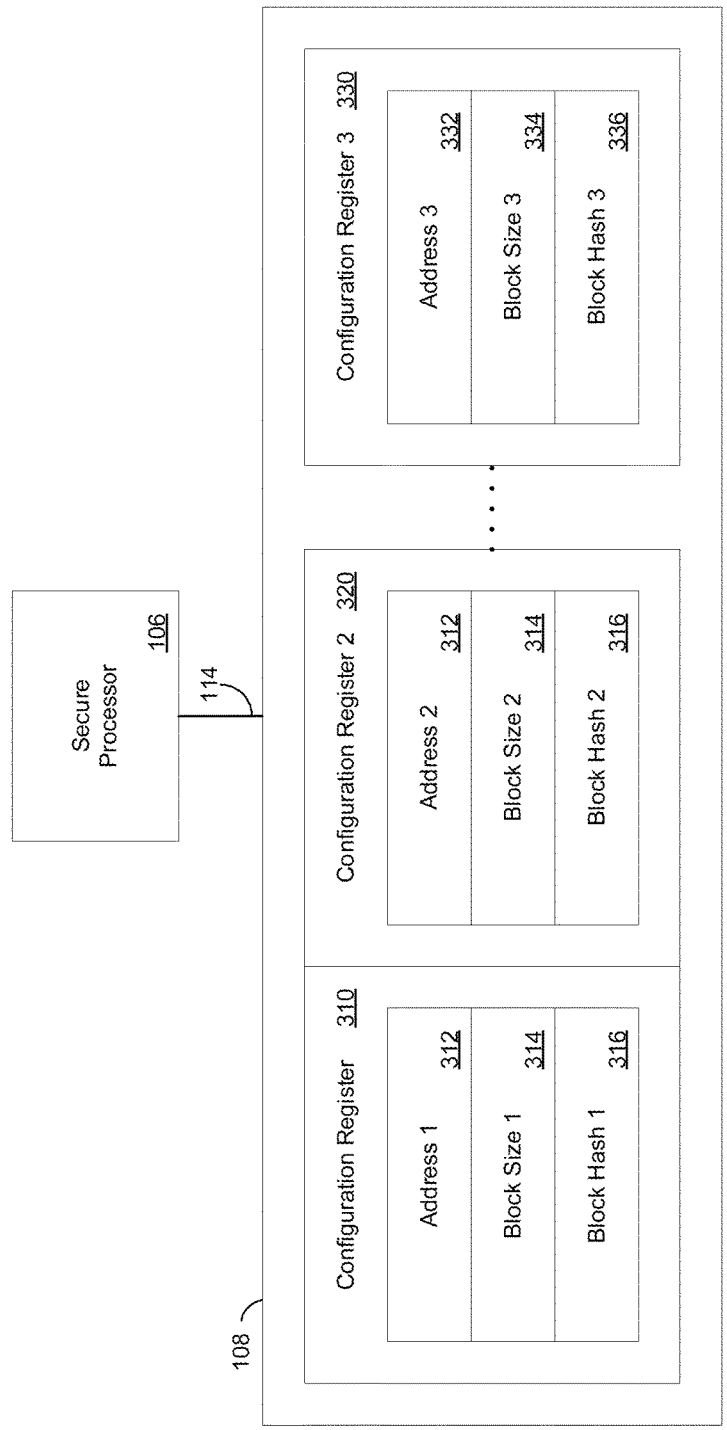
FIG. 3 illustrates an example secure register further to the example system of FIG. 1.

FIG. 3 illustrates an example secure register further to the example system of FIG. 1, in accordance with present implementations. As illustrated by way of example in FIG. 3, an example secure register 300 includes at least one of a first configuration register 310, a second configuration register 320, and a third configuration register 330. In some implementations, the example secure register 300 corresponds to the secure register 108. It is to be understood that the example secure register 300 can include an arbitrary number of configuration registers, and is not limited to the three example configuration registers 310, 320 and 330 as illustrated in FIG. 3. As one example, the example secure register 300 can include one, two or more than three configuration registers in addition to illustrated implementations. It is to be further understood that each of the configuration registers 310, 320 and 330 can include an arbitrary number of addresses, blocks, and block hashes. As one example, the example secure register 300 can include the first configuration register 310, and the first configuration register 310 can include addresses 312, 314 and 316, block sizes 314, 324 and 334, and block hashes 316, 326 and 336. Thus, in some implementations, the example secure register 300 can include an arbitrary number of configuration registers, in accordance with present implementations. Further each example secure register 300 can support one or more than one address, block size, and block hash.

The first configuration register 310 is operable to store at least one first secure instruction image. In some implementations, the first configuration register 310 includes a first address 312, a first block size 314, and a first block hash 316. In some implementations, the secure instruction image includes the first address 312, the first block size 314, and the first block hash 316. In some implementations, the secure instruction image identifies, defines, or the like, one contiguous group of addresses associated with, including, or the like, secure instructions of the system memory 104. In some implementations, the first configuration register 310 contains one or more addresses in one secure instruction image associated with one continuous memory address range. In some implementations, the first configuration register 310 contains one or more addresses in one or more secure instruction images associated with one noncontiguous memory address range including multiple noncontiguous secure instruction images. The first address 312 identifies a lowest, starting, or like address associated with the system memory 104. The first block size 314 identifies an address range, number of addresses, highest address, ending address, or the like associated with the system memory. The first block hash 316 includes a hash based at least partially on at least one address identified by the first address 312 and the first block size 314. As one example, the first block hash 316 can be derived from a cryptographic operation based on all addresses within range of the first address 312 and the first block size 314. In some implementations, the first block hash is set, written or the like during a configuration mode. In some implementations, the first block hash 316 is immutable once written.

The second configuration register 320 is operable to store at least one second secure instruction image distinct from the first secure instruction image stored at the first configuration register 310. In some implementations, the second configuration register 320 includes a second address 322, a second block size 324, and a second block hash 326. In some implementations, the second secure instruction image includes the second address 322, a second block size 324, and a second block hash 326. In some implementations, the second configuration register 320 has structure corresponding to structure of the first configuration register 310. In some implementations, the second configuration register 320 has at least one function corresponding to the first configuration register 310. In some implementations, the second address 322, the second block size 324, and the second block hash 326 correspond in at least one of structure and function to the first address 312, the first block size 314, and the first block hash 316.

The third configuration register 330 is operable to store at least one third secure instruction image distinct from the first secure instruction image stored at the first configuration register 310 and the second secure instruction image stored at the second configuration register 320. In some implementations, the third configuration register 330 includes a third address 332, a third block size 334, and a third block hash 336. In some implementations, the third secure instruction image includes the third address 332, the third block size 334, and the third block hash 336. In some implementations, the third configuration register 330 has structure corresponding to structure of the first configuration register 310. In some implementations, the third configuration register 330 has at least one function corresponding to the first configuration register 310. In some implementations, the third address 332, the third block size 334, and the third block hash 336 correspond in at least one of structure and function to the first address 312, the first block size 314, and the first block hash 316.

Figure 4:
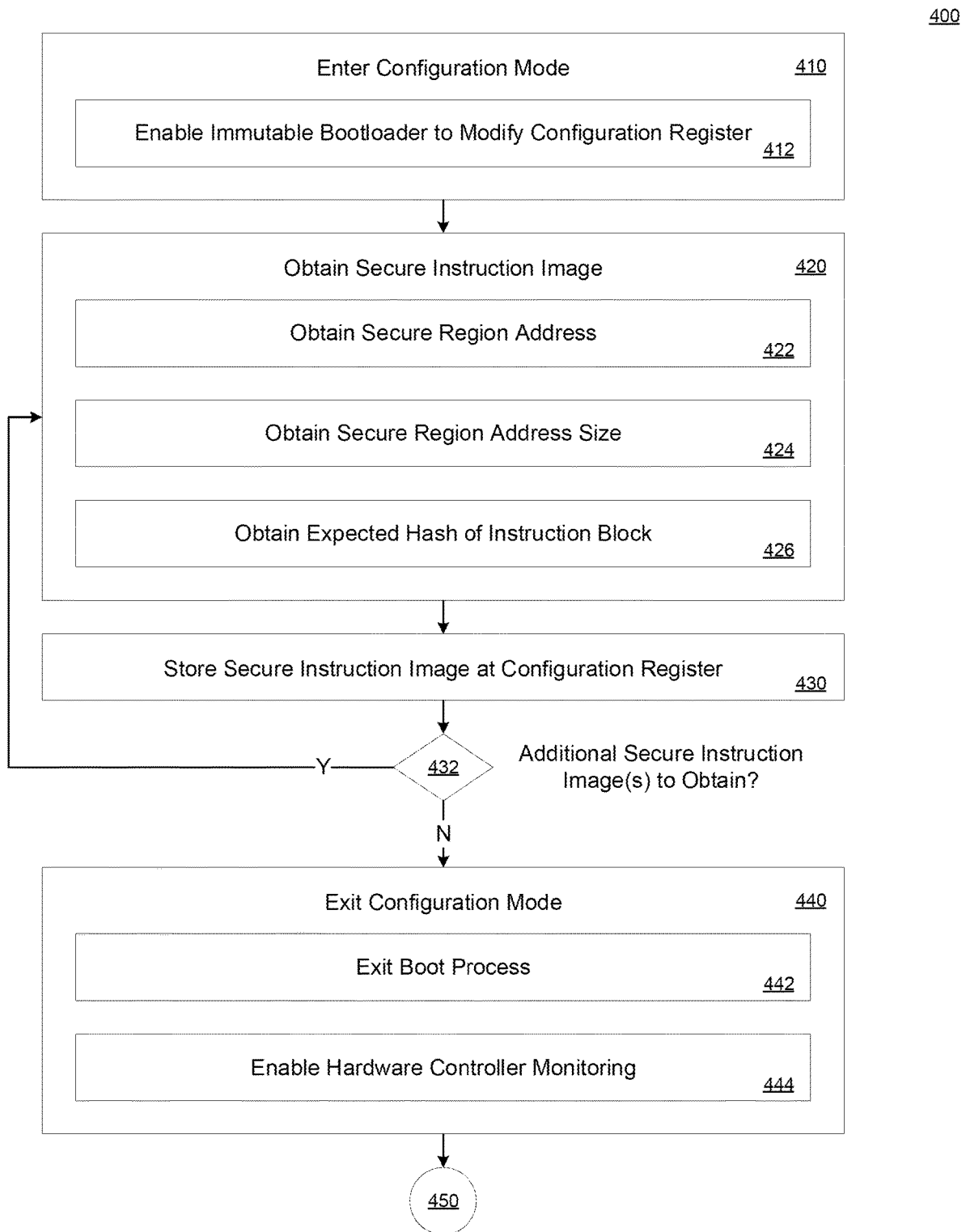
FIG. 4 illustrates an example method of enabling checking integrity of a secure computing device, in accordance with present implementations.

FIG. 4 illustrates an example method of enabling checking integrity of a secure computing device, in accordance with present implementations. In some implementations, at least one of the example system 100 and the example device 200 performs method 400 in accordance with present implementations. In some implementations, the method 400 beings at step 410.

At step 410, an example system enters a configuration mode. In some implementations, at least one of the system processor 102 and the secure processor 106 enters the configuration mode. In some implementations, the configuration mode includes a state or like of the secure processor 106 permitting modification of the secure register 108. In some implementations, the configuration mode corresponds to a flash, compile, load, or the like to or on the secure register 108 from an external device operatively coupled thereto. Thus, in some implementations, the configuration mode allows an external device to modify contents of the secure register 108 before the secure register 108 blocks any further changes thereto in accordance with an immutable configuration. In some implementations, step 410 includes step 412. At step 412, the example system enables an immutable bootloader to modify a configuration register. In some implementations, the immutable bootloader is operable to obtain modification instructions, addresses, address block sizes, and hashes from at least one of the secure processor 106, the system processor 102, and an external device. In some implementations, the system processor 102 includes the immutable bootloader. The method 400 then continues to step 420.

At step 420, the example system obtains a secure instruction image. In some implementations, at least one of the system processor 102, the secure processor 106, and the secure register 108 obtains the secure instruction image. In some implementations, the secure instruction image identifies a contiguous ranges of addresses associated with the system memory 104. In some implementations, step 420 includes at least one of steps 422, 424 and 426. At step 422, the example system obtains a secure region address. At step 424, the example system obtains a secure region address size. At step 426, the example system obtains an expected hash of instruction block. The method 400 then continues to step 430.

At step 430, the example system stores at least one secure instruction image at a configuration register. In some implementations, at least one of the system processor 102, the secure processor 106, and the secure register 108 stores at least one secure instruction image at a configuration register. In some implementations, the example system receives the secure instruction image from an external device in response to an operation to store one or more secure instructions at the system memory 104. Thus, in some implementations, the example system modifies at least one configuration register associated with the system memory 104 in connection with an operation to update secure instructions at the system memory 106. Further, in some implementations, the example system modifies at least one configuration register associated with the system memory 104 in connection with an operation to update designation of one or more instructions associated with the system memory 106 as secure instructions at the system memory 106. The method 400 then continues to step 432.

At step 432, the example system determines whether to obtain additional secure instructions. In some implementations, at least one of the system processor 102 and the secure processor 106 determines whether to obtain additional secure instructions. In some implementations, the example system obtains an image index from an external system indicating whether to obtain additional secure instructions. In some implementations, the image index includes a count of available images, and the example system iterates a counter until a number of secure images corresponding to the count of available images is satisfied. In accordance with a determination to obtain additional secure instructions, the method 400 continues to step 420. Alternatively, in accordance with a determination not to obtain additional secure instructions, the method 400 continues to step 440.

At step 440, the example system exits configuration mode. In some implementations, at least one of the system processor 102 and the secure processor 106 exits the configuration mode by modifying the state of one or more hardware devices, latches, logical units, or the like, thereof. In some implementations, the example system exits the configuration mode in accordance with a set, reset, placement, removal, or the like of one or more jumpers of the example system settable between a configuration mode and checking mode. In some implementations, step 440 includes at least one of steps 442 and 444. At step 442, the example system exits a boot process. In some implementations, the example system enters a checking mode including continuous monitoring of the system memory 104 for any modifications to the secure instructions stored thereon as designated during the configuration mode. At step 444, the example system enables hardware controller monitoring. In some implementations, at least one of the system processor 102 and the secure processor 106 enables the hardware controller 210 by the enable input node 214. In some implementations, the method 400 then continues to step 450.

Figure 5:
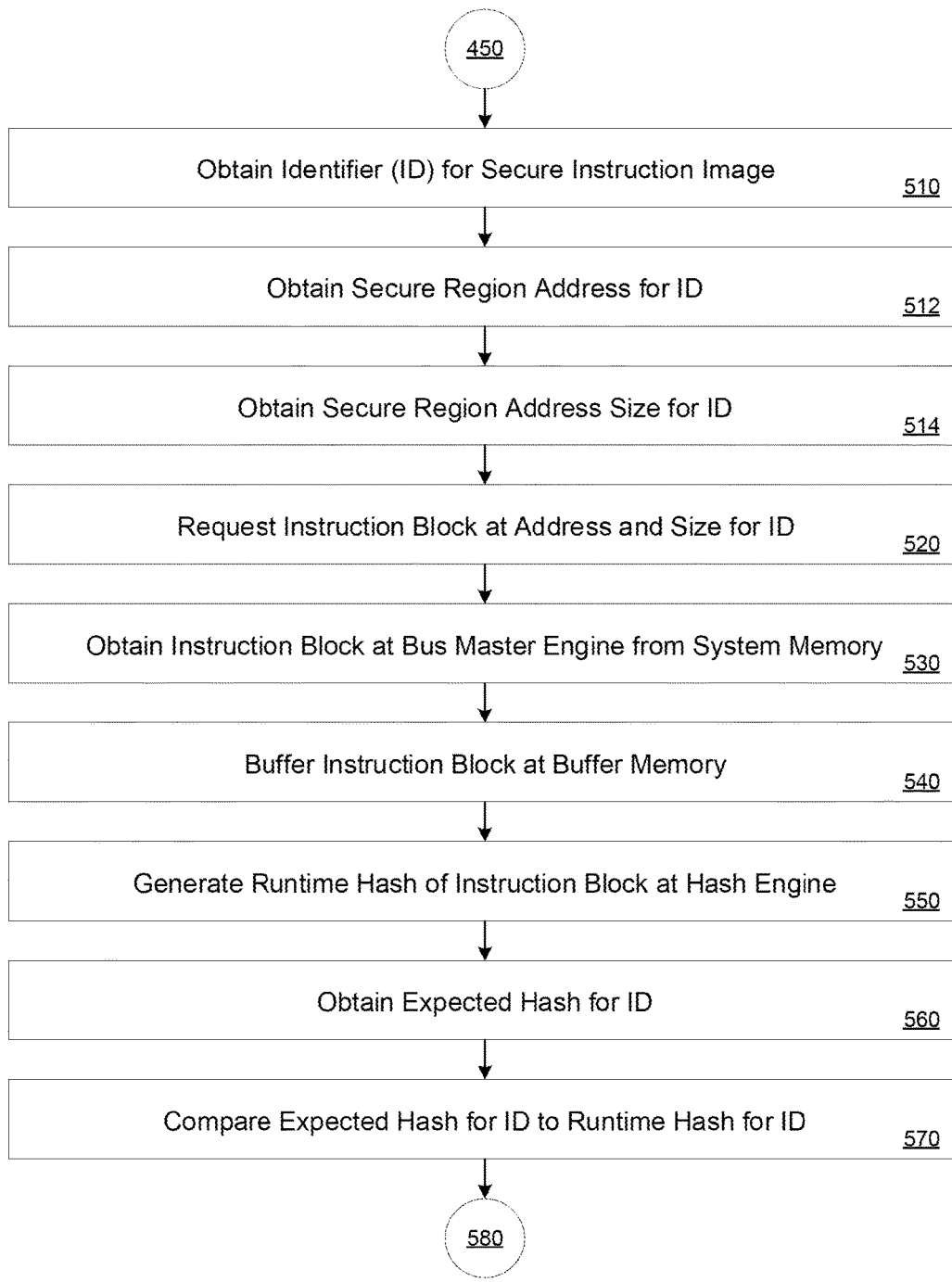
FIG. 5 illustrates an example method of checking integrity of a secure computing device further to the method of FIG. 4, in accordance with present implementations.

FIG. 5 illustrates an example method of checking integrity of a secure computing device further to the method of FIG. 4, in accordance with present implementations. In some implementations, at least one of the example system 100 and the example device 200 performs method 500 in accordance with present implementations. In some implementations, method 500 begins at step 450. The method 500 then continues to step 510.

At step 510, the example system obtains an identifier associated with a secure instruction image. In some implementations, the identifier is or includes an address associated with a secure instruction image or a configuration register. In some implementations, the identifier is or includes a compound address identifying a particular configuration register and a particular secure instruction image. In some implementations, the compound address includes a static portion identifying the configuration register, where the secure register 108 includes one configuration register. In some implementations, the compound address includes a static portion identifying the secure instruction image, where the secure register, a particular configuration register, or each configuration register of a plurality of configuration registers includes one secure instruction image. The method 500 then continues to step 512. At step 512, the example system obtains at least one secure region address associated with the identifier. In some implementations, at least one of the secure processor 106 and the hardware controller 210 obtains at least one secure region address associated with the identifier from the secure register 108. The method 500 then continues to step 514. At step 514, the example system obtains at least one secure region address size associated with the identifier. In some implementations, at least one of the secure processor 106 and the hardware controller 210 obtains at least one secure region address size associated with the identifier from the secure register 108. The method 500 then continues to step 520.

At step 520, the example system requests at least one instruction block associated with the obtained secure address and secure address size for the identifier. In some implementations, at least one of the secure processor 106 and the hardware controller 210 requests at least one instruction block from the secure register 108. The method 500 then continues to step 530.

At step 530, the example system obtains at least one instruction block at the bus master engine from the system memory. In some implementations, at least one of the secure processor 106, the hardware controller 210, and the bus master engine 220 obtains at least one instruction block at the bus master engine from the system memory 104. In some implementations, the example system obtains the instruction block asynchronously from operation of the system processor 102. Thus, in some implementations, the example system is operable to obtain the instruction block in parallel with and independently of the operation of the system processor 102. The method 500 then continues to step 540.

At step 540, the example system buffers the instruction block at a buffer memory. In some implementations, the buffer memory 230 buffers the instruction block. In some implementations, the example system buffers the instruction block asynchronously from operation of the system processor 102. Thus, in some implementations, the example system is operable to buffer the instruction block in parallel with and independently of the operation of the system processor 102. The method 500 then continues to step 550. At step 550, the example system generates at least one runtime hash associated with the instruction block at a hash engine. In some implementations, the hash engine 240 generates the runtime hash. In some implementations, the example system generates the runtime hash asynchronously from operation of the system processor 102. Thus, in some implementations, the example system is operable to generate the runtime hash in parallel with and independently of the operation of the system processor 102. The method 500 then continues to step 560.

At step 560, the example system obtains an expected hash associated with the identifier. In some implementations, the comparator 250 obtains the expected hash from the hash engine 240. The method 500 then continues to step 570. At step 570, the example system compares the expected hash to the runtime hash. In some implementations, the comparator 250 compares the expected hash to the runtime hash. In some implementations, the example system compares the expected hash to the runtime hash by comparing at least one bit of the runtime hash with a corresponding bit of the expected hash. In some implementations, the expected hash corresponds to one of the block hashes 316, 326 and 336. In some implementations, the example system obtains the expected hash asynchronously from operation of the system processor 102. Thus, in some implementations, the example system is operable to obtain the expected hash in parallel with and independently of the operation of the system processor 102. In some implementations, the method 500 then continues to step 580.

Figure 6:
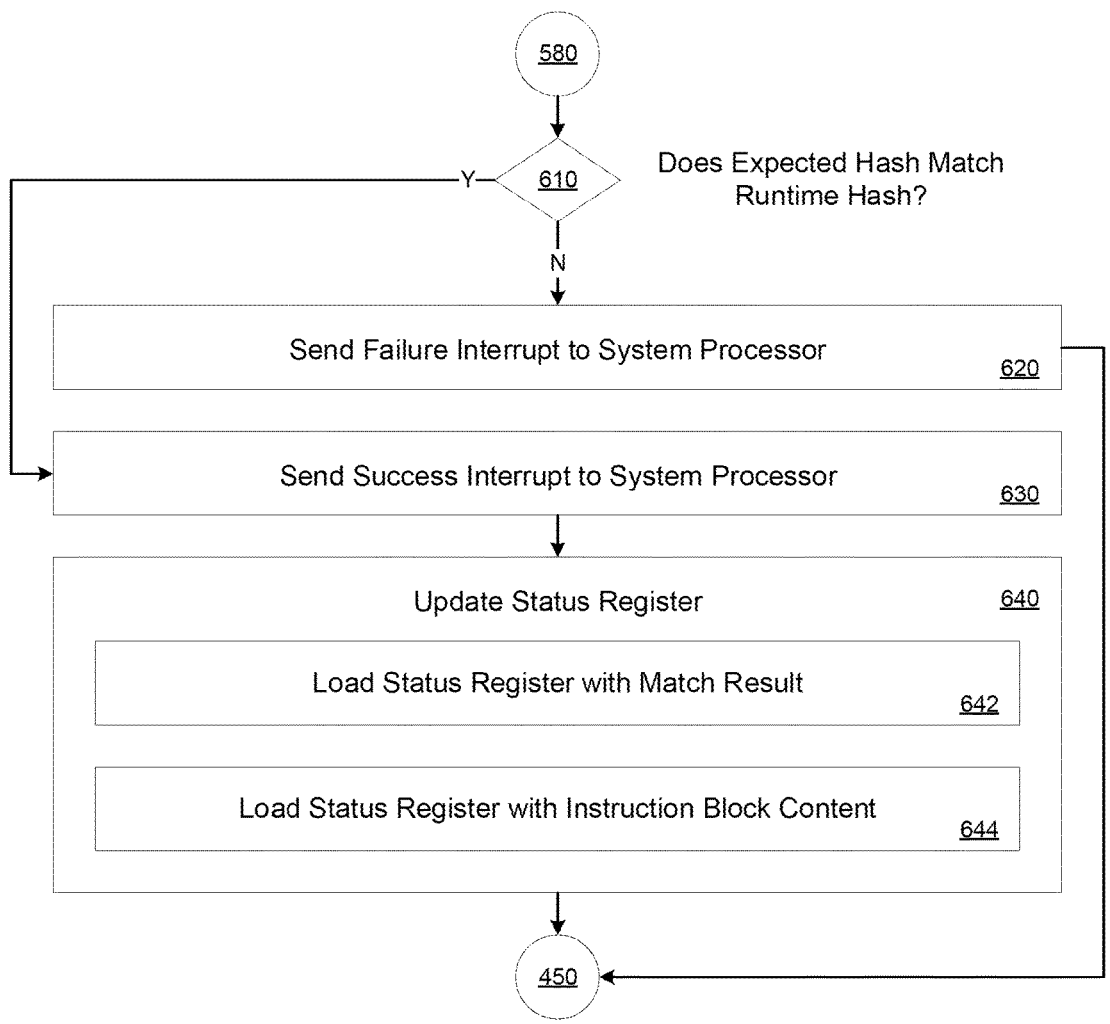
FIG. 6 illustrates an example method of checking integrity of a secure computing device further to the method of FIG. 5, in accordance with present implementations.

FIG. 6 illustrates an example method of checking integrity of a secure computing device further to the method of FIG. 5, in accordance with present implementations. In some implementations, at least one of the example system 100 and the example device 200 performs method 600 in accordance with present implementations. In some implementations, method 600 begins at step 580. The method 600 then continues to step 610.

At step 610, the example system determines whether an expected hash matches a runtime hash. In some implementations, the comparator 250 determines whether the expected hash matches the runtime hash. In accordance with a determination that the expected hash matches a runtime hash, the method 600 continues to step 630. In some implementations, the comparator 250 determines the match by determining that every bit of the runtime hash matches every corresponding bit of the expected hash. In some implementations, the comparator communicates a first binary result indicating the match to the hardware controller 210. Alternatively, in accordance with a determination that expected hash does not match a runtime hash, the method 600 continues to step 620. In some implementations, the comparator 250 determines that no match occurs by determining that at least one bit of the runtime hash does not match at least one corresponding bit of the expected hash. In some implementations, the comparator communicates a first binary result indicating the match to the hardware controller 210. It is to be understood that the expected hash and the runtime hash are not limited to binary values. As one example, the expected hash and the runtime hash can be but are not limited to binary values, hexadecimal values, alphanumeric values, octal values, non-Latin characters, and the like. In some implementations, the example system determines whether the expected hash matches the runtime hash asynchronously from operation of the system processor 102. Thus, in some implementations, the example system is operable to determine whether the expected hash matches the runtime hash in parallel with and independently of the operation of the system processor 102.

At step 620, the example system sends at least one failure interrupt to a system processor. In some implementations, the hardware controller 210 sends the failure interrupt by the interrupt output node 216. In some implementations, the example system sends the failure interrupt asynchronously from operation of the system processor 102. Thus, in some implementations, the example system is operable to send the failure interrupt in parallel with and independently of the operation of the system processor 102. The method 600 then continues to step 450.

At step 630, the example system sends at least one success interrupt to the system processor. In some implementations, the hardware controller 210 sends the success interrupt by the interrupt output node 216. In some implementations, the example system sends the success interrupt asynchronously from operation of the system processor 102. Thus, in some implementations, the example system is operable to send the success interrupt in parallel with and independently of the operation of the system processor 102. The method 600 then continues to step 640.

At step 640, the example system updates a status register. In some implementations, at least one of the secure processor 106, the hardware controller 210, and the comparator 250 updates the status register 260. In some implementations, the hardware controller 210 updates the status register 260 in response to a determination by the comparator with respect to an expected hash and a runtime hash. In some implementations, the example system updates the status register asynchronously from operation of the system processor 102. Thus, in some implementations, the example system is operable to update the status register in parallel with and independently of the operation of the system processor 102. In some implementations, step 640 includes at least one of steps 642 and 644. At step 642, the example system loads a status register with a match result. In some implementations, the match result is a binary value or the like indicating whether the comparator 250 has determined whether a match between an expected hash and a runtime hash has occurred.

At step 644, the example system loads a status register with content associated with the instruction block. In some implementations, the content can include secure instructions, data, or the like associated with the system memory 104 and one of the configuration registers 310, 320 and 330. As one example, the content can include a secure key, value, record, or the like within an address range associated with a secure instruction image. Thus, in some implementations, the example system can load secure information into the status register in response to validation of the associated secure information by matching of hashes. Accordingly, in some implementations, the example system can perform operations including the content placed in the status register 260 while restricting access to the content to at least one of the secure processor 106, the hardware controller 210, and the status register 260. In some implementations, the method 600 then continues to step 450. Alternatively, in some implementations, the method 600 ends at step 450.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of checking integrity of a secure computing device, the method comprising:
   requesting, by a system processor, an instruction block associated with one or more instructions and located at one or more addresses of a system memory;
   obtaining, by a secure processor asynchronously from the system processor, the instruction block from the system memory;
   generating, by the secure processor in response to the requesting the instruction block is located at addresses of a secure memory, a hash of the instruction block;
   obtaining, by the secure processor, an expected hash associated with the instruction block;
   comparing, by the secure processor, the expected hash with the generated hash;
   in response to a determination that the expected hash matches the generated hash, generating, by the secure processor, a first validation response associated with the instruction block; and
   enabling a hardware controller to perform the requesting the instruction block, the obtaining the instruction block, the generating the hash of the instruction block, the obtaining the expected hash, and the comparing the expected hash with the generated hash during runtime of the system processor,
   wherein the first validation response comprises loading a status register with at least one of the instructions associated with the instruction block, and
   wherein the system processor and the secure processor each enter and exit a configuration mode prior to the requesting the instruction block, and wherein the configuration mode allows a secure register to be modified by an external device.

2. The method of claim 1, wherein the first validation response comprises loading the status register with an indication that the expected hash matches the generated hash.

3. The method of claim 1, wherein the first validation response comprises sending a first interrupt signal to the system processor.

4. The method of claim 1, further comprising:
   in response to a determination that the expected hash does not match the generated hash, generating a second validation response associated with the instruction block.

5. The method of claim 4, wherein the second validation response comprises sending a second interrupt signal to the system processor.

6. The method of claim 1, further comprising:
   repeating the requesting the instruction block, the obtaining the instruction block, the generating the hash of the instruction block, the obtaining the expected hash, and the comparing the expected hash with the generated hash.

7. The method of claim 1, further comprising:
   obtaining a secure instruction image including the expected hash associated with the instruction block; and
   storing the secure instruction image at a configuration register.

8. The method of claim 7, further comprising:
   enabling a hardware controller to perform the requesting the instruction block, the obtaining the instruction block, the generating the hash of the instruction block, the obtaining the expected hash, and the comparing the expected hash with the generated hash, subsequent to the storing the secure instruction image.

9. The method of claim 1, further comprising:
   obtaining a plurality of secure instruction images, each of the plurality of secure instruction images including a respective expected hash associated with a respective instruction block of a plurality of instruction blocks; and
   storing each of the secure instruction images at a configuration register,
   wherein the instruction block is one of the plurality of instruction blocks.

10. The method of claim 9, further comprising:
    repeating, for each of the plurality of instruction blocks, the requesting the instruction block, the obtaining the instruction block, the generating the hash of the instruction block, the obtaining the expected hash, and the comparing the expected hash with the generated hash.

11. The method of claim 1, further comprising:
    buffering the instruction block at a buffer memory.

12. The method of claim 1, wherein the generating the hash of the instruction block comprises generating the hash of the instruction block during runtime of the system processor.

13. A method of enabling checking integrity of a secure computing device, the method comprising:
    obtaining, by a secure processor asynchronously from a system processor, a secure instruction image including an expected hash associated with an instruction block, the instruction block associated with a validation response and one or more instructions and located at one or more addresses of a system memory;
    storing, by the secure processor, the secure instruction image at a configuration register; and
    enabling a hardware controller of the secure processor to perform one or more hashing operations associated with the instruction block in response to a request by the system processor to obtain the instruction block located at addresses of a secure memory during runtime of a system processor; and
    enabling the hardware controller to perform the requesting the instruction block, the obtaining the instruction block, the obtaining the secure instruction image, and the storing the secure instruction image during runtime of the system processor, wherein the first validation response comprises loading a status register with at least one of the instructions associated with the instruction block, and wherein the system processor and the secure processor each enter and exit a configuration mode prior to the requesting the instruction block, and wherein the configuration mode allows a secure register to be modified by an external device.

14. The method of claim 13, further comprising:
enabling a bootloader to modify the configuration register.

15. The method of claim 14, wherein the enabling the bootloader occurs at a configuration time separate from the runtime of the system processor.

16. A system for checking integrity of a secure computing device, the system comprising:
a hardware controller of a secure processor including an enable input node and an interrupt input node, and configured to request an instruction block associated with one or more instructions and located at one or more addresses of a system memory, obtain, asynchronously from a system processor, an expected hash associated with the instruction block, and, in accordance with a determination that the expected hash matches a generated hash, generating a first validation response associated with the instruction block, the hardware controller enabled to request the instruction block, obtain the expected hash, the generating the hash of the instruction block, the obtaining the expected hash, and compare the expected hash with the generated hash during runtime of the system processor, wherein the first validation response comprises loading a status register with at least one of the instructions associated with the instruction block, and a bus master engine operatively coupled to the hardware controller, and configured to obtain the instruction block from the system memory, and buffer the obtained instruction block to a buffer memory;

a hash engine operatively coupled to the buffer memory, and configured to generate, in response to the request for the instruction block located at addresses of a secure memory, the generated hash of the instruction block;

a comparator operatively coupled to the hardware controller and the hash engine, and configured to compare the expected hash with the generated hash;

wherein the system processor and the secure processor each enter and exit a configuration mode prior to the requesting the instruction block, and wherein the configuration mode allows a secure register to be modified by an external device.

17. The system of claim 16, further comprising:
a configuration register operatively coupled to the hardware controller, and configured to store the address and the expected hash.

18. The system of claim 16, wherein the hardware controller is further configured to perform one or more hashing operations associated with the instruction block during runtime of the system processor.

* * * * *